United States Patent
Sutton et al.

(10) Patent No.: US 11,144,635 B2
(45) Date of Patent: Oct. 12, 2021

(54) RESTRICTED COMMAND SET MANAGEMENT IN A DATA STORAGE SYSTEM

(71) Applicant: International Business Machines Corporation, Armonk, NY (US)

(72) Inventors: Peter G. Sutton, Lagrangeville, NY (US); Roger G. Hathorn, Tucson, AZ (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 16/182,583

(22) Filed: Nov. 6, 2018

(65) Prior Publication Data

US 2020/0143040 A1 May 7, 2020

(51) Int. Cl.
*G06F 21/53* (2013.01)
*H04L 9/32* (2006.01)
*G06F 3/06* (2006.01)

(52) U.S. Cl.
CPC .............. *G06F 21/53* (2013.01); *G06F 3/067* (2013.01); *G06F 3/0622* (2013.01); *G06F 3/0659* (2013.01); *H04L 9/3263* (2013.01)

(58) Field of Classification Search
CPC ........ G06F 21/53; G06F 3/067; G06F 3/0659; G06F 3/0622; G06F 21/78; G06F 21/85;
(Continued)

(56) References Cited

U.S. PATENT DOCUMENTS 6,226,749 B1 * 5/2001 Carloganu .............. G06F 21/31
726/2
7,370,350 B1 5/2008 Salowey
(Continued)

OTHER PUBLICATIONS

E. Androulaki et al., "Enforcing Location and Time-based Access Control on Cloud-stored Data" dated 2014, 2014 IEEE 34th International Conference on Distributed Computing Systems, Total 12 pages.

(Continued)

*Primary Examiner* — Farid Homayounmehr
*Assistant Examiner* — Sanchit K Sarker
(74) *Attorney, Agent, or Firm* — Konrad, Raynes, Davda and Victor LLP; William K. Konrad

(57) ABSTRACT

An embodiment of restricted command set management permits a storage controller to execute commands of a restricted command set if authorized. A command determined to be within the restricted command set is encrypted by a host prior to sending the encrypted command to a storage controller for execution. The command may be encrypted using a key shared between the host and the storage controller. The shared key may be generated by the host and encrypted by the host using a public key of a public-private key maintained by the storage controller. The encrypted shared key may be decrypted by the storage controller using the private key of the public-private key maintained by the storage controller. Execution of commands of the restricted command set is prevented absent proper decryption of the commands sent by the host. Other features and aspects may be realized, depending upon the particular application.

15 Claims, 6 Drawing Sheets

(58) Field of Classification Search
CPC ....... H04L 9/32; H04L 9/3263; H04L 9/0894; H04L 9/0825; H04L 9/604
See application file for complete search history.

(56) References Cited

U.S. PATENT DOCUMENTS

| | | | |
|---|---|---|---|
| 7,409,545 B2 | 8/2008 | Perlman | |
| 7,908,482 B2 | 3/2011 | Lauter et al. | |
| 8,218,773 B2 | 7/2012 | Brown et al. | |
| 8,837,741 B2 | 9/2014 | Hawkes et al. | |
| 9,531,685 B2 | 12/2016 | Gero et al. | |
| 10,740,491 B2* | 8/2020 | Liu | G06F 21/44 |
| 2012/0284527 A1* | 11/2012 | Nagpal | H04L 63/04 |
| | | | 713/189 |
| 2013/0097538 A1* | 4/2013 | Park | G06F 3/0488 |
| | | | 715/765 |
| 2015/0199244 A1* | 7/2015 | Venkatachalam | G06F 11/20 |
| | | | 714/6.3 |
| 2016/0269367 A1* | 9/2016 | Cocotis | H04L 67/1097 |
| 2019/0073156 A1* | 3/2019 | Velusamy | G06F 3/0658 |
| 2019/0107945 A1* | 4/2019 | Chun | G06F 3/0638 |

OTHER PUBLICATIONS

Wikipedia, "Galois/Counter Mode", (online) Retrieved from the Internet on Sep. 8, 2018 from URL>Retrieved from https://en.wikipedia.org/w/index.php?title=Galois/Counter_Mode&oldid=858618526, Total 6 pages.

Wikipedia, "Public-key Cryptography" (online) Retrieved from the Internet on Jul. 23, 2018 from URL>Retrieved from 'https://en.wikipedia.org/w/index.php?title=Public-key_cryptography&oldid=851218348, Total 15 pages.

* cited by examiner

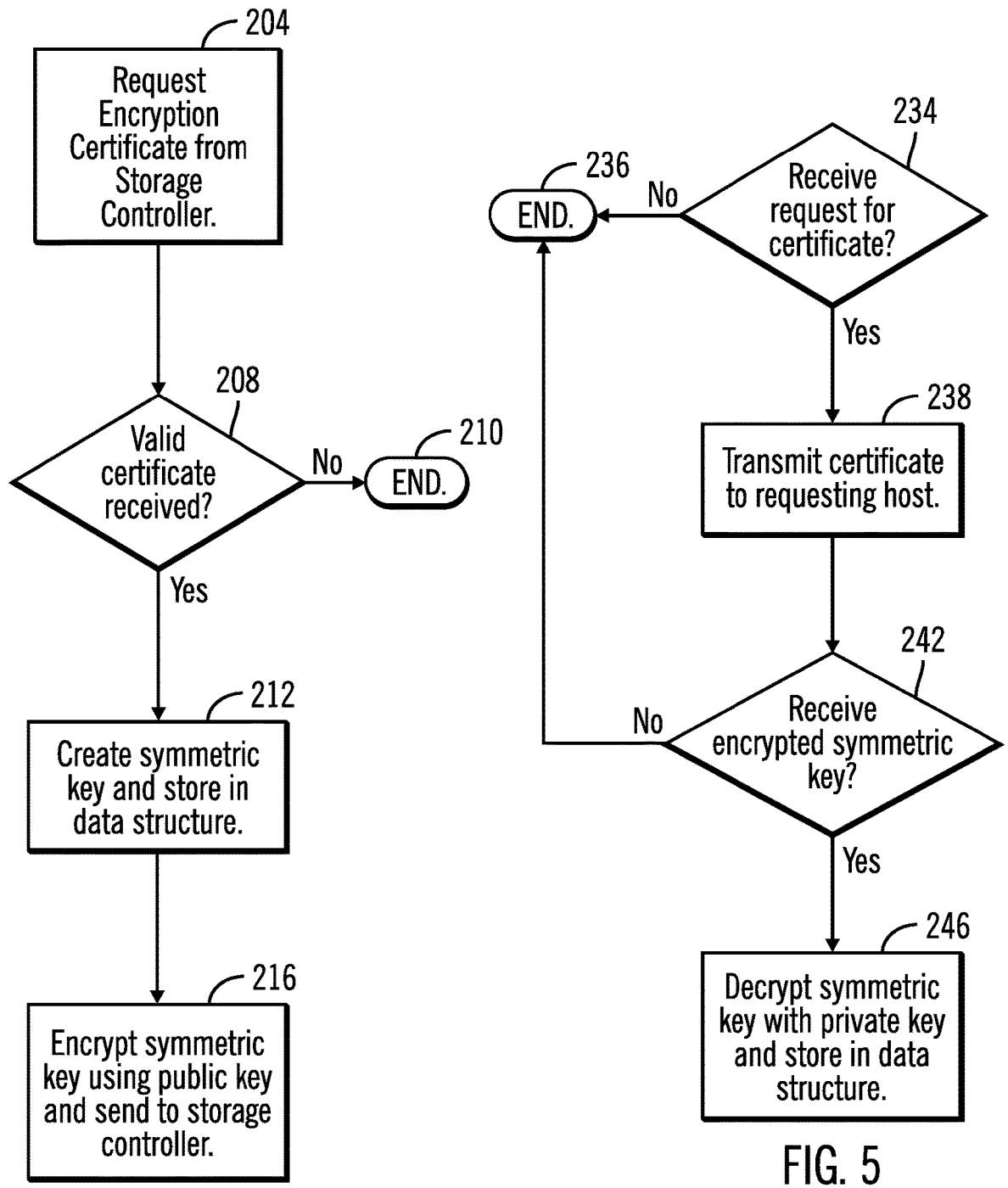

RESTRICTED COMMAND SET MANAGEMENT IN A DATA STORAGE SYSTEM

BACKGROUND OF THE INVENTION

1. Field

The present invention relates to a computer program product, system, and method for restricted command set management in data storage systems.

2. Description of the Related Art

Data backup systems can provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy. Stored data may be encrypted to prevent unauthorized access to the stored data. Input/output (I/O) operations may be used to transfer data between a host and I/O devices of an I/O processing system. For example, data may be written from memory of a host to one or more I/O devices, and data may be read from one or more I/O devices to memory of a host by executing I/O operations in response to commands from a host.

Customer data may be protected using "at rest" type data encryption techniques. For example, a host may encrypt customer data at the host, transmit the encrypted customer data to an I/O device, read the encrypted customer data back from the I/O device and decrypt the customer data read from the I/O device. As another example, the I/O device itself may encrypt customer data received from a host prior to storing the customer data as encrypted data. In response to a read operation initiated by the host, the I/O device decrypts encrypted customer data prior to transmitting the customer data back to the host.

To facilitate processing of I/O operations, an I/O subsystem of the I/O processing system may be employed. The I/O subsystem is coupled to a host and the I/O devices of the I/O processing system and directs the flow of information between the host and the I/O devices. One example of an I/O subsystem is the IBM z14 processor channel subsystem. The channel subsystem uses channel paths as communications media. Data entering a channel subsystem may be encrypted "in flight" and then decrypted prior to exiting the channel subsystem to deter snooping along the data path.

SUMMARY

Restricted command set management in accordance with the present description, provides a significant improvement in computer technology. For example, restricted command set management in one aspect of the present description can prevent unauthorized execution of sensitive commands sent by a host to a storage controller which has not been authorized to execute such commands. Further, commands outside a restricted command set are executed without significant impact on performance.

In one embodiment, a storage controller receives a command from a host and determines if the received command is within a restricted command set. In response to the determination concerning the received command, the storage controller selectively decrypts the received command if encrypted, and selectively executes a decrypted command. For example, in one embodiment, commands sent to the storage controller are first encrypted by the host in whole or in part if the commands are within the set of restricted commands, and are sent unencrypted if outside the restricted command set. The storage controller decrypts a received command if the received command is determined to be within the restricted command set and bypasses decryption if the received command is determined to be outside the restricted command set.

In another aspect, the storage controller checks integrity of the received command including the integrity of the decryption of the received command using an integrity pass/fail test. In one embodiment, the decrypted command is executed if the decrypted command passes the integrity pass/fail test and blocks execution of the decrypted command if the decrypted command fails the integrity pass/fail test. In still another aspect, if the storage controller receives an unencrypted command, the storage controller bypasses use of the integrity test and executes the received unencrypted command if the received unencrypted command is determined to be outside the restricted command set.

In still another aspect, a host determines whether a command to be transmitted to a storage controller is within the restricted command set, and if so, encrypts the command in whole or in part. Conversely, if the command is determined to be outside the restricted command set, the host bypasses encrypting the command.

In one embodiment, the host obtains a public encryption/decryption key of a public-private encryption/decryption key pair for the storage controller, obtains a symmetric encryption/decryption key, encrypts the symmetric encryption/decryption key using the storage controller public encryption/decryption key, and transmits the symmetric key to the storage controller in encrypted form. The storage controller decrypts the symmetric key using the private encryption/decryption key of the public-private key pair of the storage controller. In one embodiment, the host may obtain the storage controller public key in a certificate in which the certificate has been digitally signed to evidence authenticity and that the storage controller is authorized to execute commands of the restricted command set.

In yet another aspect, the host uses the shared symmetric key to encrypt commands in whole or in part if the commands are within the restricted command set, and the storage controller uses the shared symmetric key to decrypt received encrypted commands which are within the restricted command set. Decrypted commands are executed by the storage controller if the decrypted command passes the integrity pass/fail test.

Implementations of the described techniques may include hardware, a method or process, or computer software on a computer-accessible medium. Other features and aspects may be realized, depending upon the particular application.

BRIEF DESCRIPTION OF THE DRAWINGS

FIG. 4 illustrates an example of operations of a host controller employing restricted command set management in accordance with one aspect of the present description.

FIG. 5 illustrates an example of operations of a storage controller employing restricted command set management in accordance with one aspect of the present description.

DETAILED DESCRIPTION

Figure 1:
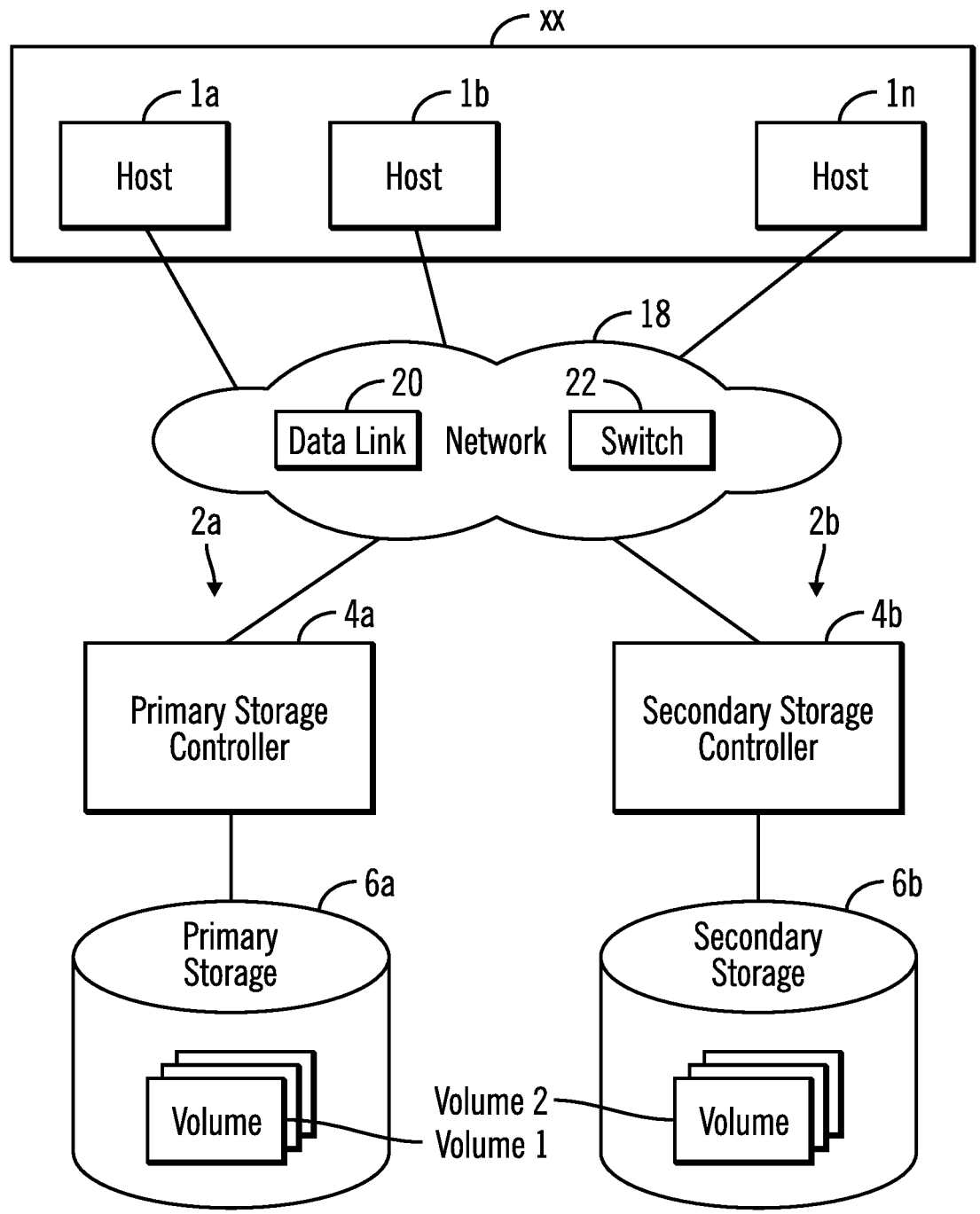
FIG. 1 illustrates an embodiment of a computing environment employing restricted command set management in a data storage system in accordance with one aspect of the present description.

In the following description, reference is made to the accompanying drawings which form a part hereof and which illustrate several embodiments. It is understood that other embodiments may be utilized and structural and operational changes may be made.

Restricted command set management in accordance with the present description provides a significant improvement in computer technology. As previously noted, encryption has been used to protect at-rest customer data provided by a host or stored in a storage controller. Encryption has also been used to protect in-flight data transmissions in data connections between a host and a storage controller against unauthorized access to the encrypted data while being transmitted through the data connection. However, it is appreciated herein that known encryption techniques do not selectively prevent unauthorized access to sensitive commands sent by a host for execution by a storage controller.

In one aspect of restricted command set management in accordance with the present description, encryption is used to selectively prevent unauthorized access to certain sensitive command functions as identified in a set of restricted commands. For example, a storage controller prevents the execution of commands within the restricted command set unless execution of those commands of the restricted command set has been authorized. If authorized for execution, a host may encrypt a command in whole or in part if the command is within a restricted command set, and send the encrypted command to the storage controller for decryption and execution. Absent proper encryption and decryption of a command of the restricted set of commands, execution of a command of the restricted set of commands is prevented.

By comparison, commands outside the restricted command set may be executed without any significant overhead caused by encryption and decryption. As a result, restricted command set management in accordance with the present description can avoid adverse impact on system performance for commands outside the restricted command set. In this manner, security of a data storage systems may be improved for commands within the restricted command set, while reducing or eliminating any adverse impact on system performance for commands outside the restricted set of commands. According, restricted command set management in accordance with the present description provides a significant improvement in computer technology.

In one aspect of restricted command set management in accordance with the present description, a host is selectively enabled to send commands of the set of restricted commands which are acceptable to a storage controller authorized to execute the restricted command set. In one embodiment, restricted command set encryption logic of a host requests a digitally signed certificate from the storage controller in preparation for encrypting and transmitting commands of a restricted command set. In this example, the certificate is digitally signed to evidence authenticity of the certificate using a private key of a public-private key pair maintained by the vendor of the storage controller or other certified authority which is permitted to authorize execution of commands of the restricted command set. Upon receipt of the requested certificate from the storage controller, the restricted command set encryption logic of the host determines whether the received certificate is valid. using the public key of a public-private key pair maintained by the certified authority. It is appreciated that the host may obtain a certificate in a variety of techniques depending upon the particular application. For example, the host may obtain the certificate directly from the certified authority. Certificates may be shared by the host and storage controller either in band in a protected read, for example, or out of band using a key server, for example, or shared automatically or manually, for example.

If the restricted command set encryption logic of the host determines that the certificate is valid, the restricted command set encryption logic obtains from the certificate a copy of a public key of a public-private key pair maintained by the storage controller. In addition, in one embodiment, the restricted command set encryption logic obtains a copy of the restricted command set which lists the restricted commands which the storage controller is authorized to execute. It is appreciated that in some embodiments, one or more of the pubic key of a public-private key pair maintained by the authority and the list of commands of the restricted command set may be public information readily available to the host.

In one embodiment, the restricted command set encryption logic of the host generates a symmetric encryption/decryption key. However, it is appreciated that a symmetric key may be obtained and shared by the host and storage controller using a variety of techniques depending upon the particular application. For example, the host and storage controller may use a shared key server, or may be manually configured with a symmetric key.

In this embodiment, the host encrypts the symmetric key using the public key of the public-private key pair maintained by the storage controller for transmission to the storage controller. The encrypted symmetric key is decrypted by restricted command set decryption logic of the storage controller using the private key of the public-private key pair maintained by the storage controller. At this point, the initialization operations of the host and storage controller are complete, and the host is enabled to transmit encrypted commands of the set of restricted commands which are acceptable to the storage controller which decrypts and executes the commands of the restricted command set. In some embodiments, the host may send commands at this point to the storage controller to turn on restricted command set decryption. In other embodiments, restricted command set decryption may be triggered in the storage controller by successful decryption of the encrypted symmetric key received by the storage controller.

As described in greater detail below, the restricted command set encryption logic of the host uses the symmetric key to encrypt commands of the restricted command set prior to sending commands of the restricted command set to the storage controller. Received encrypted commands of the restricted command set are in turn decrypted by restricted command set decryption logic of the target storage controller using the decrypted copy of the symmetric key shared with the host. The storage controller tests the integrity of the decryption prior to executing a decrypted command of the restricted command set.

In one embodiment, parameters of a command of the restricted command set are encrypted by the host instead of the entire command to facilitate determining by the restricted command set decryption logic of the storage controller, whether or not a command received by the storage controller is a command of the restricted command set notwithstanding partial encryption of the received command. For example, a command identification (ID) of an encrypted command may remain unencrypted by the host to facilitate the determination by the storage controller as to whether the received encrypted command is within the restricted command set.

If the received command is determined to be a command of the restricted command set, the parameters of the received command are decrypted and subjected to an integrity test to ensure proper encryption and decryption of the command parameters before the command of the restricted command set is executed by the storage controller. Conversely, if the received command is determined to not be a command of the restricted command set, the command parameters will not have been encrypted by the host. Accordingly, a command outside the restricted command set may be executed directly without first decrypting parameters of the received command or subjecting the command to an integrity test.

In this manner, security of data storage systems may be improved for commands within the restricted command set, while reducing or eliminating any adverse impact on system performance for commands outside the restricted set of commands. According, restricted command set management in accordance with the present description provides a significant improvement in computer technology.

Implementations of the described techniques may include hardware, a method or process, or computer software on a computer-accessible medium. A system of one or more computers may be configured for restricted command set management in a data storage system in accordance with the present description, by virtue of having software, firmware, hardware, or a combination of them installed on the system that in operation causes or cause the system to perform restricted command set management in accordance with the present description. For example, one or more computer programs may be configured to perform restricted command set management in a data storage system by virtue of including instructions that, when executed by data processing apparatus, cause the apparatus to perform operations including one or more of host processor operations and storage controller processor operations.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
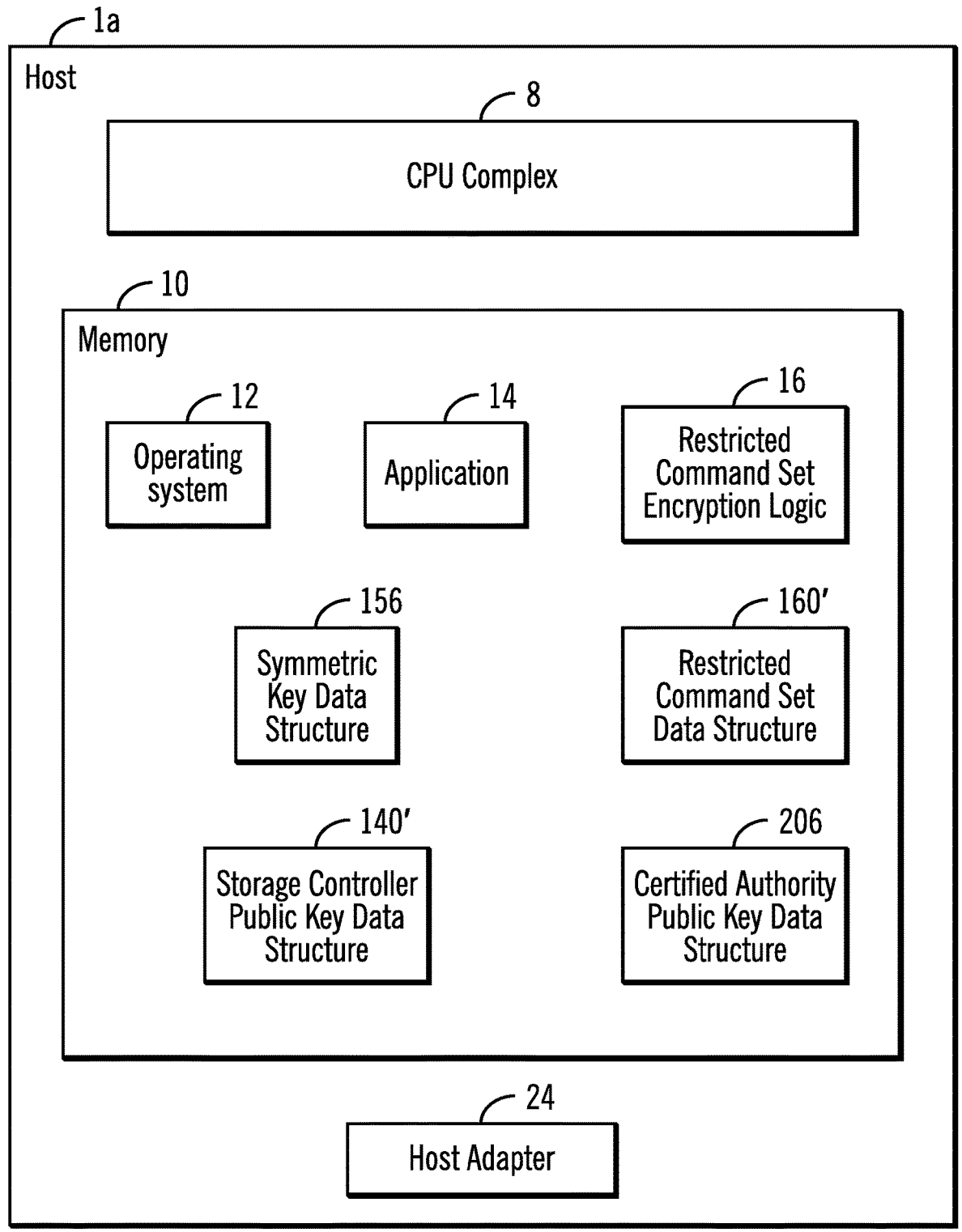
FIG. 2 illustrates an example of a host of the computing environment of FIG. 1.
Figure 3:
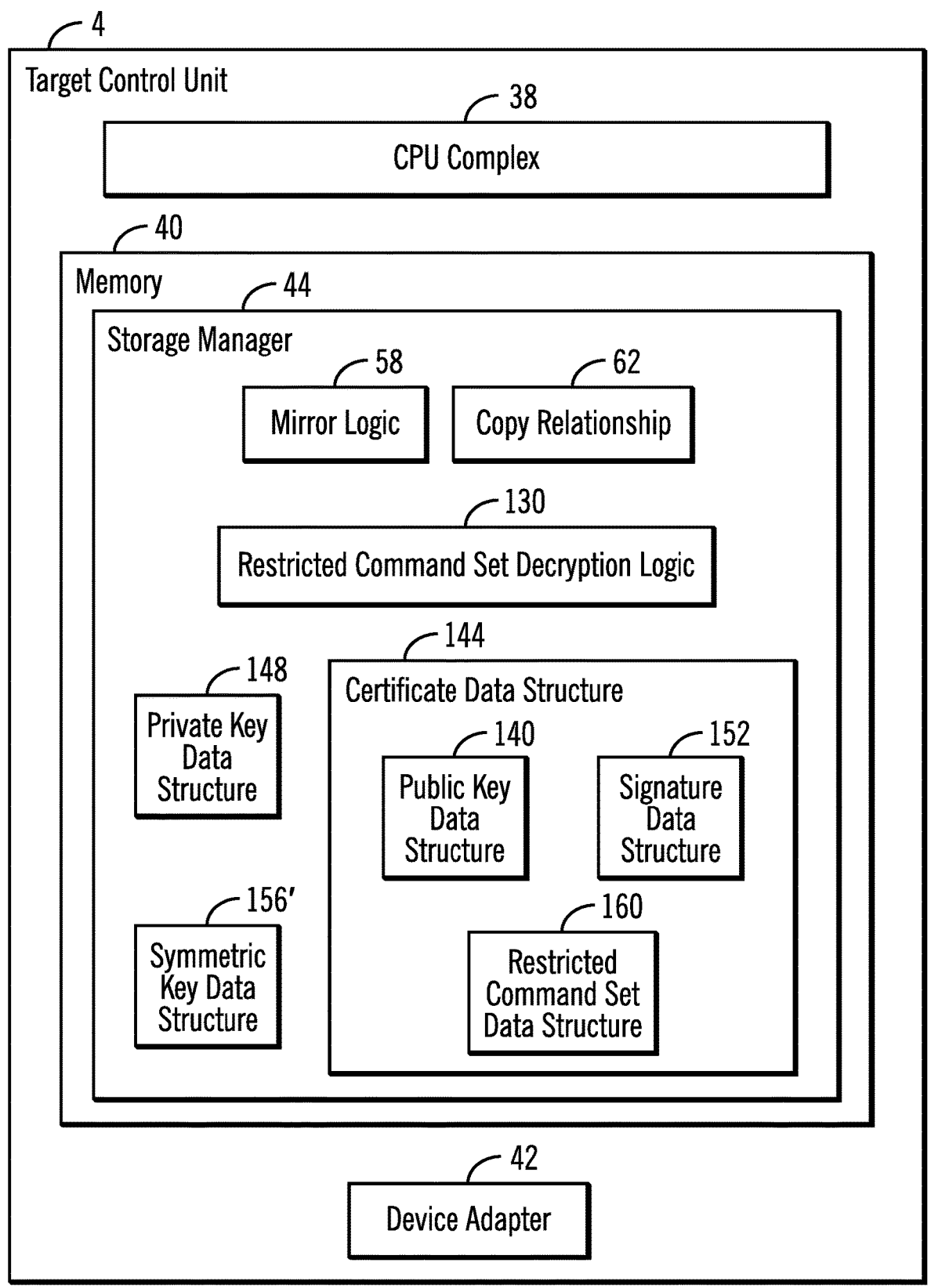
FIG. 3 illustrates an example of a storage controller of the computing environment of FIG. 1.

FIGS. 1-3 illustrate an embodiment of a computing environment employing restricted command set management in a data storage system in accordance with the present description. A plurality of hosts 1a (FIGS. 1, 2), 1b . . . 1n may submit Input/Output (I/O) requests to one or more data storage devices or systems 2a, 2b, to read or write data. Each data storage system 2a, 2b includes a storage control unit or storage controller 4a, 4b, respectively, an example of which is shown in greater detail in FIG. 3 as storage controller 4, which accesses user data and metadata stored in multiple data storage units of storage 6a, 6b, respectively.

The hosts 1a, 1b . . . 1n may be separate physical devices or may be virtual devices implemented using assigned resources of partitions of a server, for example. In a similar manner, the storage controllers 4, 4a, 4b of the data storage systems 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

A typical host as represented by the host 1a of FIG. 2 includes a CPU complex 8 including one or more processors and a memory 10 having an operating system 12, an application 14 and restricted command set encryption logic 16 that encrypts commands of a restricted command set to prevent execution of commands within the restricted command set by an unauthorized storage controller 4 (FIG. 3), 4a, 4b. The restricted command set encryption logic 16 may be implemented in software, hardware, firmware or any combination thereof. An example of a suitable operating system is the z/OS operating system. It is appreciated that other types of operating systems may be employed, depending upon the particular application.

The I/O requests to the data storage systems 2a, 2b may be transmitted over a network 18 (FIG. 1) which may include one or more data links 20 and switches 22 of a connection fabric to provide a connection path through the connection fabric between a selected host 1a, 1b . . . 1n and a selected target such as a data storage system 2a, 2b. The hosts are configured to initiate an I/O operation targeting a data storage system 2a, 2b, over a data link 20 (FIG. 1) of the connection fabric of the network 18. Each host 1a, 1b . . . 1n has one or more host adapters 24 (FIG. 2) which connects a host to a data link 20 of the network 18. The hosts and the data storage systems 2a, 2b communicate in accordance with the Fibre Channel Protocol (FCP), FICON or any other suitable protocol.

Thus, the system components 1a (FIG. 1), 1b . . . 1n, 4 (FIG. 3), 4a, 4b, 6a, 6b, are connected to the network 18 which enables communication among these components. As noted above, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

The hosts 1a, 1b . . . 1n and the storage controllers 4, 4a, 4b controlling storage devices 6a, 6b, may each comprise any suitable computational device including those presently known in the art, such as, a personal computer, a workstation, a server, a mainframe, a hand held computer, a palm top computer, a telephony device, a network appliance, a blade computer, a processing device, etc. The hosts 1a, 1b . . . 1n and the storage controllers 4, 4a, 4b may be elements in any suitable network, such as, a storage area network, a wide area network, the Internet, an intranet. In certain embodiments, hosts 1a, 1b . . . 1n and the storage controllers 4, 4a, 4b may be elements in a cloud computing environment.

It is appreciated that one or more data storage units of the storage 6a, 6b may comprise any suitable device capable of storing data in a nonvolatile manner, such as hard drives, solid state drives, tape drives, etc., known in the art. Thus, in one embodiment, the storage 6a, 6b may be comprised of one or more sequential access storage devices, such as hard disk drives and magnetic tape drives or may also include non-sequential access storage devices such as solid state drives (SSD), for example. Such additional devices of storage 6a, 6b may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 6a, 6b may also be other types of storage such as solid state drives in a RAID configuration to facilitate data recovery in the event of loss of a solid state drive. The storage units of the storage 6a, 6b may be configured to store data in subunits of data storage such as volumes, tracks, etc.

Each storage controller 4 (FIG. 3), 4a, 4b of the illustrated embodiment, includes a CPU complex 38 (FIG. 3) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein. The CPU complex 8 of a host may have similar components.

Each storage controller 4 (FIG. 3), 4a, 4b further has a memory 40 that includes a storage manager 44 configured to manage storage operations including writing data to or reading data from a storage unit of an associated storage 6a, 6b in response to an I/O data request from a host or mirrored data from another data storage system. Each storage controller 4 (FIG. 3), 4a, 4b has one or more device adapters 42 (FIG. 3) which connects a storage controller to a data link 20 (FIG. 1) of the network 18. The storage manager 44 includes appropriate storage device drivers to configure associated storage 6a, 6b.

The CPU complex 38 of each storage controller 4 (FIG. 3), 4a, 4b may have multiple clusters of processors, each cluster having its own assigned memory 40, storage manager 44, cache, etc. The processing and memory resources assigned each cluster may be physical, virtual, shared, transferrable or dedicated, depending upon the particular application.

In the illustrated embodiment, the storage manager 44 includes mirror logic 58 that is configured to execute in the primary storage controller 4a (FIG. 1) and perform copy operations to copy tracks or other portions of storage volumes from the primary storage controller 4a to the secondary storage controller 4b in a consistent manner. For example, a primary-secondary pair of volumes, volume1, volume2 are in an asynchronous copy or mirror relationship 62 such that updates to the primary volume1 are asynchronously mirrored to each secondary volume2.

In the illustrated embodiment, a copy relationship is represented by a data structure as represented by the copy relationships 62 of the memory 40 of FIG. 3. Thus, one or more copy relationships 62, which may be maintained by the mirror logic 58 for the primary and secondary storage controllers 4a, 4b, (FIG. 1) associate primary storage locations in the primary storage 6a and corresponding secondary storage locations in each of the secondary storage drives as represented by the storage 6b of the mirror relationship, such that updates to locations of the primary storage 6a are mirrored, that is, copied to the corresponding locations of the secondary storage 6b. For example, source storage locations in a primary storage volume1 (FIG. 1) of storage 6a may be asynchronously mirrored in a mirror operation to target storage locations of a secondary volume2 of the storage 6b pursuant to a mirror copy relationship 62 (FIG. 3). Similarly, source storage locations in the primary storage volume1 (FIG. 1) of storage 6a may be asynchronously mirrored in a mirror operation to additional target storage locations of another secondary volume2 of another secondary data storage system pursuant to a mirror copy relationship 62 (FIG. 3).

In the illustrated embodiment, a copy relationship of the copy relationships 62 comprises an asynchronous mirror relationship for a pair of storage locations in which updates to the primary (source) storage locations of the mirror relationship 62 are asynchronously mirrored to the secondary (target) storage locations of the mirror relationship 62. It is appreciated that other types of copy relationships such as synchronous, for example, may be established, depending upon the particular application.

In one aspect of the present description, the storage controller 4 includes a restricted command set decryption logic 130 for decrypting and executing commands within the restricted command set if the storage controller 4 is authorized to execute commands within the restricted command set. The restricted command set decryption logic 130 may be implemented in software, hardware, firmware or any combination thereof.

In one embodiment, the restricted command set decryption logic 130 of the storage controller 140 maintains a pair of encryption/decryption keys, namely a "public" key stored in a data structure 140 (hereinafter referred to simply as "public key 140") which is communicated to a requesting host in a suitable certificate stored in a data structure 144 (hereinafter simply "certificate 144"), and a "private" key stored in a data structure 148 (hereinafter simply "private key 148"), which is not communicated to the hosts. The certificate 144 includes a digital signature stored in a data structure 152 (hereinafter simply "digital signature 152"), which may be used by a host requesting the certificate 144 for authentication purposes. The digital signature 152 may be signed by the vendor of the target storage controller 4 or other certified authority. The certificate 144 may include a message such as the public key 140 of the storage controller and a list of commands which form the restricted command set. The restricted command set may be stored in a data structure 160.

The key pair of public key 140 and private key 148 of the storage controller may be generated using suitable cryptographic techniques, both those currently known and those which may become known through advances in the cryptographic arts. For example, an unpredictable (typically large and random) number may be used to begin generation of an acceptable public-private pair of keys.

In the illustrated embodiment, restricted command set management in accordance with the present description uses both an asymmetric key encryption/decryption scheme or process and a symmetric key encryption/decryption process. In an asymmetric key encryption scheme, any processing unit possessing the public key of the public-private key pair, can encrypt messages using the public key, but only a processing unit which holds the paired private key can decrypt. In a symmetric key encryption/decryption process, a symmetric key is shared and kept secret by both the sender for encryption purposes and the receiver for decryption purposes. In the illustrated embodiment, a symmetric encryption/decryption key data structure 156 (FIG. 2) (hereinafter simply "symmetric key 156") is generated by the host and shared with the storage controller 4 as symmetric key 156' (FIG. 3) if the storage controller 4 has a valid certificate 144. It is appreciated that restricted command set management in accordance with the present description may utilize other types encryption/decryption schemes, depending upon the particular application.

As described in greater detail below, the restricted command set decryption logic 130 of one embodiment, uses the storage controller's public key 140 of a validly signed certificate 144, and the storage controller's private key 148 of a public-private key pair maintained by the storage controller, together with the symmetric key 156', to restrict the execution of commands within the restricted command set, to storage controllers which have been authorized to perform commands within the restricted command set. In this manner, unauthorized access to commands within the restricted command set is avoided. In one embodiment, a storage controller lacking a valid digitally signed certificate 144 is not authorized to perform commands within the restricted command set.

FIG. 4 depicts one example of operations of the restricted command set encryption logic 16 (FIG. 2) of a host such as the host 1a, performing one embodiment of restricted command set management in accordance with the present description. If the operations of FIG. 4 are successful, the host is enabled to send commands of the set of restricted commands which are acceptable to the storage controller 4. In this embodiment, the restricted command set encryption logic 16 is configured to request (block 204, FIG. 4) the certificate 144 (FIG. 3) from the storage controller 4 in preparation for encrypting and transmitting commands of a restricted command set. In this example, the storage controller 4 has a valid copy of the certificate 144 which has been properly digitally signed as represented by signature 152 to evidence authenticity of the certificate 144. For example, in the illustrated embodiment, the certified authority digitally signing the certificate 144 may maintain a private key (other than the private key 148) of a public-private key pair maintained by the certified authority and combines a message of the certificate 144 with the certified authority's private key using known public key signature techniques to create the digital signature 152 on the message of the certificate 144. The public key of the certified authority's public-private key is known to the host requesting the certificate 144 and is stored in a certified authority public key data structure 206 (FIG. 2).

As noted above, it is appreciated that the host may obtain a certificate in a variety of techniques depending upon the particular application. For example, the host may obtain the certificate directly from the certified authority. Certificates may be shared by the host and storage controller either in band in a protected read, for example, or out of band using a key server, for example, or shared automatically or manually, for example.

Upon receipt of the requested certificate, the restricted command set encryption logic 16 is configured to determine (block 208, FIG. 4) whether the received certificate is valid. In this embodiment, the restricted command set encryption logic 16 processes the message which may include the storage controller's public key 140, the restricted command set 160 and the digital signature 152 of the certificate 144 (FIG. 3) using known public key signature techniques to determine whether the signature 152 of received certificate is valid or authentic, that is, whether the digital signature 152 is the digital signature of an authorized vendor of the target storage controller 4 or other certified authority authorized to permit the target storage controller 4 to execute restricted set commands. For example, the certificate 144 encrypted with the certified authority's private key, may be decrypted by the host using the certified authority's public key 206 (FIG. 2), establishing the authenticity or validity of the certificate 144.

If the restricted command set encryption logic 16 determines (block 208, FIG. 4) that the received certificate is not valid, that is, invalid, the initialization process ends (block 210, FIG. 4) prior to a successful conclusion. As a result, the host is not enabled to send commands of the set of restricted commands which are acceptable to the storage controller 4. Conversely, if the restricted command set encryption logic 16 determines (block 208, FIG. 4) that the received certificate is valid, the restricted command set encryption logic 16 stores a copy of the public key 140 from the certificate 144 in a data structure 140' (hereinafter referred to simply as "public key copy 140'") and stores a copy of the restricted command set 160 in a data structure 160' (hereinafter referred to simply as "restricted command set 160'"). In addition, the restricted command set encryption logic 16 is configured to generate (block 212, FIG. 4) a symmetric encryption/decryption key which is stored in a data structure 156 (hereinafter referred to simply as "symmetric key 156").

As described in greater detail below, the restricted command set encryption logic 16 uses the symmetric key 156 to encrypt commands of the restricted command set prior to sending commands of the restricted command set to the storage controller 4. Received encrypted commands of the restricted command set are in turn decrypted by the target storage controller 4 using a copy 156' (FIG. 3) of the symmetric key 156. Accordingly, the restricted command set encryption logic 16 encrypts (block 216, FIG. 4) or "wraps" the generated symmetric key using the storage controller's public key copy 140' obtained from a valid certificate 144 and sends the symmetric key 156 in encrypted form to the storage controller 4. As explained below, the storage controller 4 decrypts the symmetric key 156 received in encrypted form using the private key 148 of the public-private key pair maintained by the storage controller 4 and stores it in a data structure as the symmetric key copy 156' (FIG. 3). However, it is appreciated that a symmetric key may be obtained and shared by the host and storage controller using a variety of techniques depending upon the particular application. For example, the host and storage controller may use a shared key server, or may be manually configured with a symmetric key.

At this point, the initialization operations of FIG. 4 are successful, and the host is enabled to send commands of the set of restricted commands which are acceptable to the storage controller 4 subject to additional commands in some embodiments. For example, in one embodiment, the restricted command set encryption logic 16 may send a suitable command to the restricted command set decryption logic 130 of the storage controller 4 to use the symmetric key copy 156' (FIG. 3) for decrypting commands of the restricted command set. Such a command to the storage controller 4 to use the symmetric key copy 156' (FIG. 3) may trigger the storage controller and the host to turn on restricted command set encryption/decryption as described herein. Alternatively, in other embodiments, an explicit command may be provided to turn on or turn off restricted command set encryption/decryption as described herein. In yet another embodiment, the restricted command set encryption logic 16 may send a suitable query to the restricted command set decryption logic 130 of the storage controller 4 to report that the storage control unit 4 is using restricted command set encryption/decryption as described herein.

FIG. 5 depicts one example of operations of the restricted command set decryption logic 130 (FIG. 3) of a storage controller such as the storage controller 4, performing one embodiment of restricted command set management in accordance with the present description. If the operations of FIG. 5 are successful, the storage controller is enabled to receive and execute encrypted commands of the set of restricted commands. In this embodiment, the restricted command set encryption logic 16 is configured to receive (block 234, FIG. 4) a request for the certificate 144 (FIG. 3) from a host in preparation for receipt from that host of encrypted commands of a restricted command set. As noted above, in this example, the storage controller 4 has a valid copy of the certificate 144 which has been properly digitally signed as represented by signature 152 to evidence authenticity of the certificate 144. For example, in the illustrated embodiment, a message of the certificate 144 has been combined by the certified authority with the private key of the public-private key maintained by the certified authority, using known public key signature techniques to create the digital signature 152 on the message of the certificate 144.

Upon receipt of the request for the certificate, the restricted command set decryption logic 130 is configured to send (block 238, FIG. 5) the requested certificate to the requesting host for the requesting host to determine whether the sent certificate is valid as described above. Conversely, if the restricted command set decryption logic 130 fails to receive (block 234, FIG. 5) a request for the certificate 144 from a host, the operations of FIG. 5 end (block 236, FIG. 5) and the storage controller 4 is not enabled to receive and execute encrypted commands of the set of restricted commands from any host which fails to request the certificate 144.

As noted above, it is appreciated that the host may obtain a certificate in a variety of techniques depending upon the particular application. Thus, in embodiments in which the host receives the certificate from a source other than the storage controller for example, the operations of blocks 234 and 238 may be omitted.

If the restricted command set decryption logic 130 fails to receive (block 242, FIG. 5) an encrypted symmetric key from a host requesting the certificate 144, the operations of FIG. 5 end (block 236, FIG. 5) and the storage controller 4 is not enabled to receive and execute encrypted commands of the set of restricted commands from any requesting host which fails to send an encrypted symmetric key. For example, if the restricted command set encryption logic 16 of a host receiving the requested certificate determines that the received certificate is not valid as described above, the requesting host ends its initialization process as described above and does not send an encrypted symmetric key to the storage controller from which it obtained an invalid certificate. As a result, the storage controller initialization process of FIG. 5 ends (block 236, FIG. 5) prior to a successful conclusion, and the storage controller is not enabled to execute encrypted commands of the set of restricted commands.

Conversely, if the restricted command set encryption logic 16 of the requesting host determines that the received certificate is valid in the manner described above, the restricted command set encryption logic 16 of the requesting host sends an encrypted symmetric key to the storage controller from which it obtained a valid certificate. Accordingly, the restricted command set decryption logic 130 receives (block 242, FIG. 5) an encrypted symmetric key from a host which received the valid certificate 144, and decrypts (block 246, FIG. 5) the symmetric key 156 received in encrypted form using the private key 148 of the storage controller's public-private key pair and stores it in a data structure as the symmetric key copy 156' (FIG. 3). At this point, the initialization operations of FIG. 5 are successful, and the storage controller 4 is enabled to decrypt and execute encrypted commands of the set of restricted commands. As noted above, in some embodiments, the host may send suitable commands to turn on restricted command set decryption in the storage controller or may send a query asking the storage controller to confirm that it has enabled restricted command set decryption using the symmetric key provided by the host. In other embodiments, receipt of the symmetric key from the host may be sufficient to trigger the turning on of restricted command set decryption in the storage controller.

Figure 6:
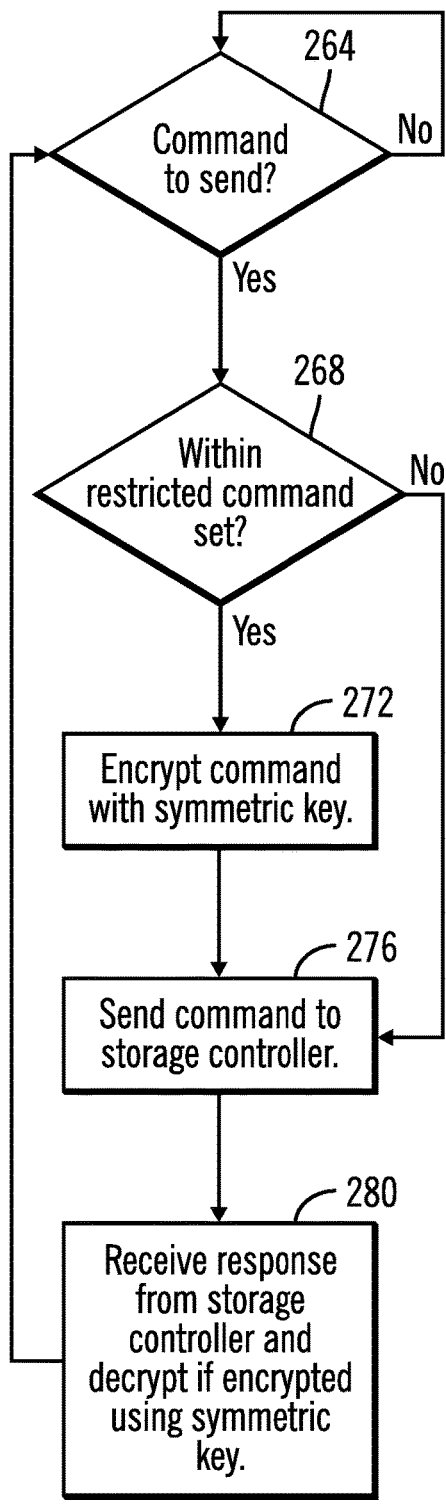
FIG. 6 illustrates another example of operations of a host employing restricted command set management in accordance with one aspect of the present description.

FIG. 6 depicts another example of operations of the restricted command set encryption logic 16 (FIG. 2) of a host such as the host 1a, performing one embodiment of restricted command set management in accordance with the present description. In this embodiment, the operations of FIG. 4 were successfully concluded and the host is enabled to send encrypted commands of the set of restricted commands which are acceptable to the storage controller 4. In this example, the restricted command set encryption logic 16 is configured to determine (block 264, FIG. 6) whether a command is to be sent to the storage controller 4. If so, a determination is made as to whether (block 268, FIG. 6) the command to be sent is within the restricted set of commands.

A command may be assigned to a set of restricted commands using a variety of criteria. For example, one criteria may be whether the command is a command which causes the transfer of data between a host and a storage controller. In one embodiment, commands which do not cause the transfer of data between a host and a storage controller may be appropriate candidates for assignment to the restricted command set. Another criterion may be whether the command is a legacy command which prior models of the storage controller executed without encryption or other restrictions. Another criterion may be, for example, whether the command provides a capability not found on prior models of the storage controller. Yet another criterion may be whether the command provides a premium capability over other non-premium features of the particular model of the storage controller. It is appreciated that the criteria defining the set of restricted commands may vary depending upon the particular application.

If the restricted command set encryption logic 16 determines (block 268, FIG. 6) that a command to be sent to the storage controller 4 is within the restricted set of commands, the restricted command set encryption logic 16 encrypts (block 272, FIG. 6) the command in whole or in part, using a symmetric key such as the symmetric key 156 (FIG. 2) for example, known to the target storage controller 4, prior to sending (block 276, FIG. 6) the command of the restricted command set to the storage controller 4. In this manner, the restricted command set encryption logic 16 selectively encrypts the command if the command if the command is within the restricted command set.

In one embodiment, the entire command including command parameters may be encrypted if it is within the restricted command set. In other embodiments, the command may be encrypted in part. For example, in one embodiment, the parameters of the command may be encrypted while leaving other portions of the command such as a command identification unencrypted. As explained in greater detail below, encrypting the parameters of a command can prevent unauthorized execution of a command within the restricted command set. However, leaving a portion of the command such as the command identification left unencrypted, may facilitate a determination by the restricted command set decryption logic 130 of the storage controller as to whether a received command is within the restricted command set prior to any decryption of the received command.

If the storage controller 4 sends a response to a received command within the restricted command set, the response in one embodiment may be encrypted as well using the symmetric key copy 156' (FIG. 3). Accordingly, the restricted command set encryption logic 16 of the host decrypts (block 280, FIG. 6) any encrypted response using the symmetric key 156 (FIG. 2).

Conversely, if the restricted command set encryption logic 16 determines (block 268, FIG. 6) that a command to be sent to the storage controller 4 is not within the restricted set of commands, the restricted command set encryption logic 16 bypasses encryption of the command and instead sends (block 276, FIG. 6) the command to the storage controller 4 without encryption by the restricted command set encryption logic 16. In this manner, the restricted command set encryption logic 16 selectively bypasses encrypting the command if the command is outside the restricted command set.

In the illustrated embodiment, a command of the restricted command set is encrypted by the restricted command set encryption logic 16 using a symmetric encryption/decryption key such as the symmetric key 156 (FIG. 2) for example. Encryption and decryption using a shared symmetric encryption/decryption key can frequently be performed more quickly and with less impact on system performance as compared to other encryption/decryption techniques. It is appreciated that encryption (and decryption) of commands of a restricted command set may be performed using other encryption/decryption techniques, depending upon the particular application.

Figure 7:
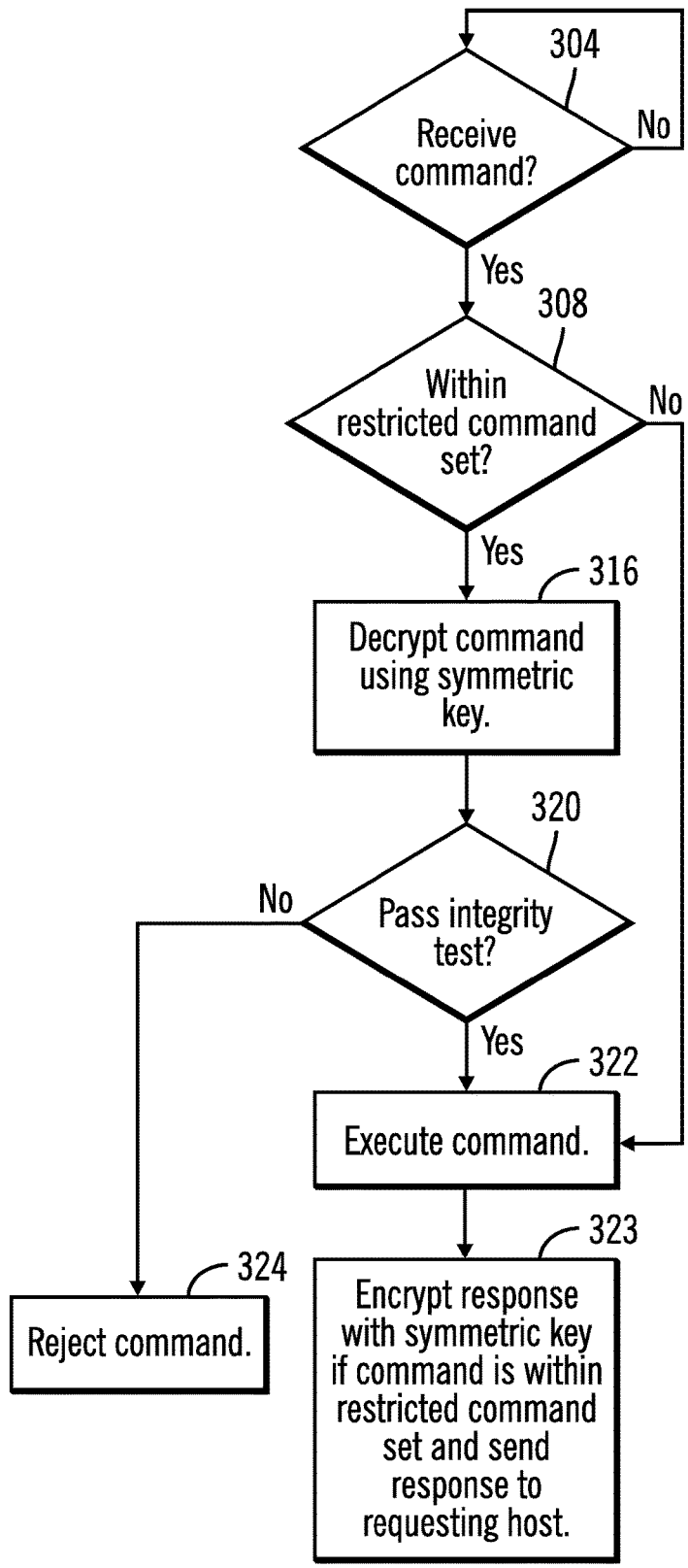
FIG. 7 illustrates another example of operations of a storage controller employing restricted command set management in accordance with one aspect of the present description.

FIG. 7 depicts another example of operations of the restricted command set decryption logic 130 (FIG. 3) of a storage controller such as the storage controller 4, performing one embodiment of restricted command set management in accordance with the present description. In this embodiment, the operations of FIG. 5 were successfully concluded and the storage controller is enabled to receive and decrypt encrypted commands of the set of restricted commands. In this embodiment, the restricted command set decryption logic 130 is configured to determine (block 304, FIG. 7) whether a command sent by a host has been received by the storage controller 4. If so, a determination is made as to whether (block 308, FIG. 6) the received command is within the restricted set of commands in a manner similar to that described above in connection with FIG. 6.

If the restricted command set decryption logic 130 determines (block 308, FIG. 7) that a command received by the storage controller 4 is within the restricted set of commands, the restricted command set decryption logic 130 decrypts (block 316, FIG. 7) the command using a symmetric key such as the symmetric key 156' for example, known to the host and used by the host to encrypt (block 272, FIG. 6) the command of the restriction command set, prior to sending (block 276, FIG. 6) the command of the restricted command set to the storage controller 4. In this manner, the restricted command set decryption logic 130 selectively decrypts the received command if the received command is determined to be within the restricted command set.

As noted above, inn one embodiment, the entire command including command parameters may be encrypted by the host if it is within the restricted command set. In other embodiments, the command may be encrypted in part. For example, in one embodiment, the parameters of the command may be encrypted while leaving other portions of the command such as a command identification unencrypted. Encrypting the parameters of a command prevents unauthorized execution of a command within the restricted command set until the parameters are successfully decrypted and tested for integrity as explained below. However, leaving a portion of the command such as the command identification left unencrypted, may facilitate a determination by the restricted command set decryption logic 130 of the storage controller as to whether a received command is within the restricted command set prior to any decryption of the received command.

In another aspect of restricted command set management in accordance with the present description, the restricted command set decryption logic 130 tests the integrity of the decryption (block 316) and determines (block 320, FIG. 7) whether the decryption passes the integrity test. For example, an integrity test such as a Galois/Counter Mode (GCM) may be applied to ensure that the decryption result yields a valid result before the command is executed. A valid result may be obtained if the received command was encrypted with the same symmetric key such as the symmetric key 156 (FIG. 2) of the host that was used to decrypt the received command, such as the symmetric key 156' (FIG. 3) of the storage controller 4. Another condition for a valid result is that the encryption by the host and the decryption by the storage controller be performed without error.

If the decryption of the received command passes (block 320, FIG. 7) the integrity test, the storage controller executes (block 322, FIG. 7) the command of the restricted command set. In this manner, the storage controller selectively executes the decrypted command if the decrypted command passes an integrity pass/fail test. Further, if the storage controller 4 sends (block 323, FIG. 7) a response to a command within the restricted command set, the response in one embodiment may be encrypted as well using the symmetric key copy 156' (FIG. 3) by the restricted command set decryption logic 130 of the storage controller 4. As noted above, the restricted command set encryption logic 16 of the host decrypts (block 280, FIG. 6) any encrypted response using the symmetric key 156 (FIG. 2).

However, if the received command was encrypted with a different key than that used to decrypt the received command or was not encrypted at all despite being a command of the restricted command set, an invalid result will be detected and the decryption will fail (block 320, FIG. 7) the integrity test. Similarly, if a processing error occurred in either the encryption of the command by the host or the decryption of the received command by the storage controller, the decryption will fail (block 320, FIG. 7) the integrity test.

In response to a failure to pass the integrity test, the restricted command set decryption logic 130 rejects (block 324, FIG. 7) the received command and does not execute it. In this manner, the restricted command set decryption logic 130 selectively blocks execution of the decrypted command if the decrypted command fails the integrity pass/fail test.

In one embodiment, upon a failure to pass the integrity pass/fail test, the restricted command set decryption logic 130 will generate and send to the host a suitable error message which, in one embodiment, will itself be encrypted using the shared symmetric key 156'. In response to the error message, the host can re-encrypt (block 272, FIG. 6) the command and send (block 276, FIG. 6) the re-encrypted command. Alternatively, the host can perform again the initialization process of FIG. 4 in case an error occurred during the initialization process. However, it is appreciated that the decryption may fail (block 320, FIG. 7) the integrity test because the storage controller 4 lacked a validly signed certificate 144 because the storage controller was not authorized to perform commands of the restricted command set.

If the restricted command set decryption logic 130 determines (block 308, FIG. 7) that a received command is not within the restricted set of commands, the restricted command set decryption logic 130 bypasses decryption of the command. Instead, the restricted command set decryption logic 130 permits the received command to be executed (block 322, FIG. 7) without decryption by the symmetric key and without the integrity test. In this manner, commands which are not within the set of restricted commands, may be executed without restriction.

It is seen from the above, that restricted command set management in accordance with the present description can improve security of a data storage systems for commands within a restricted command set, while reducing or eliminating any adverse impact on system performance for commands outside the restricted set of commands. According, restricted command set management in accordance with the present description provides a significant improvement in computer technology.

Figure 8:
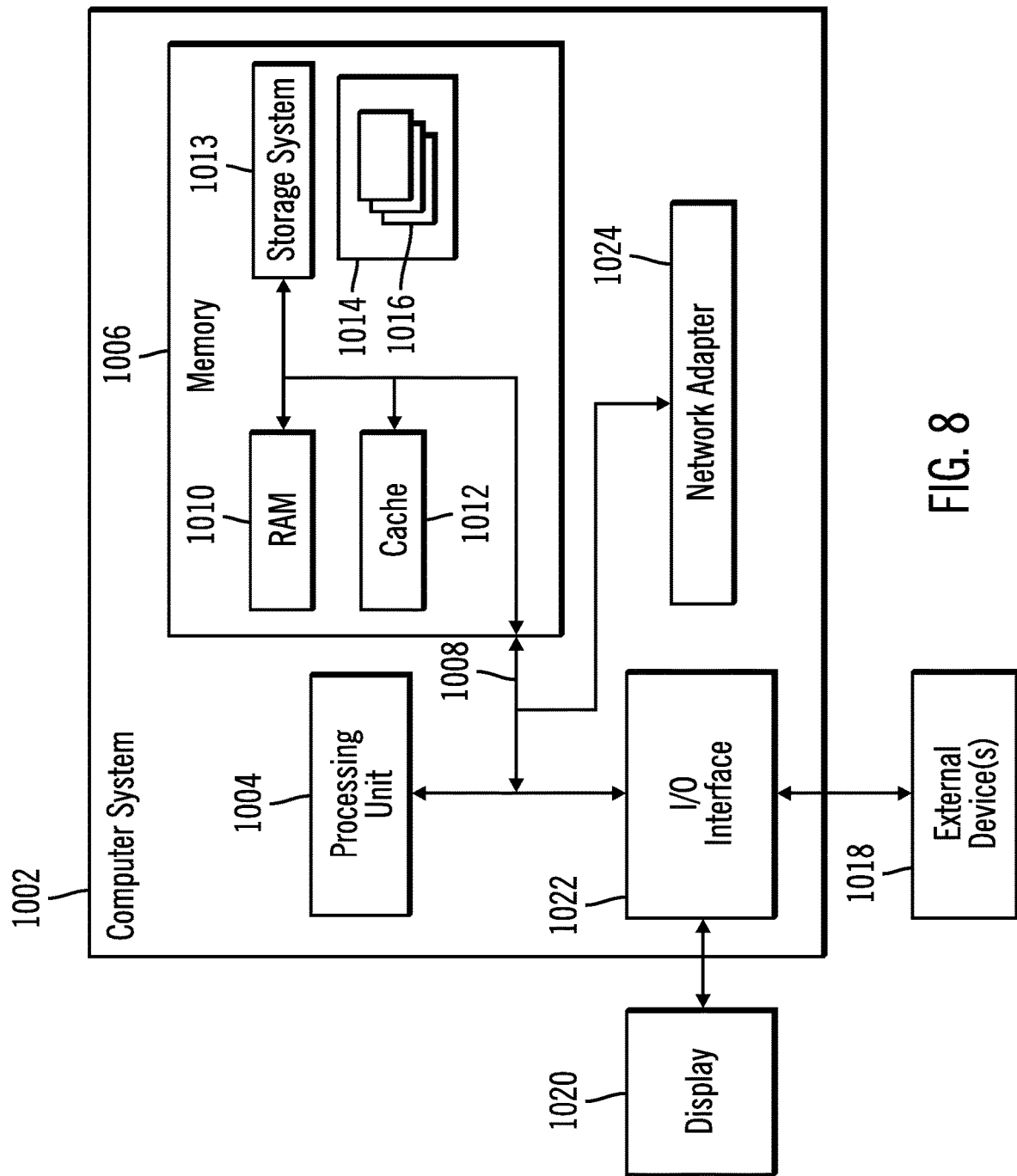
FIG. 8 illustrates another computer embodiment employing restricted command set management in a data storage system in accordance with the present description.

The computational components of the figures may each be implemented in one or more computer systems, such as the computer system 1002 shown in FIG. 8. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with a data storage system having a storage controller and at least one storage unit of a plurality of storage units controlled by the storage controller, wherein the storage controller has a processor, and wherein the computer program product comprises a computer readable storage medium having program instructions embodied therewith, the program instructions executable by a processor of the storage controller to cause storage controller processor operations, the storage controller processor operations comprising:

controlling said plurality of storage units to perform Input/Output (I/O) operations requested by a host;
receiving a command from the host;
determining if the received command is within a restricted command set;

in response to said determining if the received command is within the restricted command set, selectively decrypting the received command; and
selectively executing a decrypted command;
wherein selectively decrypting the received command includes decrypting the received command if the received command is determined to be within the restricted command set and bypassing decrypting the received command if the received command is determined to be outside the restricted command set; and
wherein the host has a processor, and wherein the computer program product further comprises a further computer readable storage medium having further program instructions embodied therewith, the further program instructions executable by a processor of the host to cause host processor operations, the host processor operations comprising:
determining whether a command to be transmitted to a storage controller is within the restricted command set;
selectively encrypting the command to be transmitted to the storage controller, wherein selective encrypting the command includes encrypting the command if the command is within the restricted command set and bypassing encrypting the command if the command is outside the restricted command set;
transmitting an encrypted command within the restricted command set to the storage controller; and
transmitting an unencrypted command outside the restricted command set to the storage controller.

2. The computer program product of claim 1 wherein the storage controller processor operations further comprise:
checking integrity of received command decrypting using an integrity pass/fail test; and
wherein selectively executing the decrypted command includes executing the decrypted command if the decrypted command passes the integrity pass/fail test and blocking execution of the decrypted command if the decrypted command fails the integrity pass/fail test.

3. The computer program product of claim 1, wherein the storage controller processor operations further comprise:
receiving an unencrypted command; and
selectively executing the received unencrypted command if the received unencrypted command is determined to be outside the restricted command set.

4. The computer program product of claim 1 wherein the host processor operations further comprise:
obtaining a public encryption/decryption key of a public-private encryption/decryption key pair for the storage controller;
obtaining a symmetric encryption/decryption key;
encrypting the symmetric encryption/decryption key using the public encryption/decryption key; and
transmitting the encrypted symmetric encryption/decryption key to the storage controller; and
wherein the storage controller processor operations further comprise:
receiving the encrypted symmetric encryption/decryption key; and
decrypting the symmetric encryption/decryption key using a private encryption/decryption key of the public-private encryption/decryption key pair for the storage controller.

5. The computer program product of claim 4 wherein the host encrypting the command includes encrypting the command using the symmetric encryption/decryption key and wherein the storage controller decrypting the received command includes decrypting the received command using the symmetric encryption/decryption key.

6. A method, comprising:
operations by a storage controller including:
controlling storage units to perform Input/Output (I/O) operations requested by a host;
receiving a command from the host;
determining if the received command is within a restricted command set;
in response to said determining if the received command is within the restricted command set, selectively decrypting the received command; and
selectively executing a decrypted command;
wherein selectively decrypting the received command includes decrypting the received command if the received command is determined to be within the restricted command set and bypassing decrypting the received command if the received command is determined to be outside the restricted command set; and
the method further comprising operations by a host including:
determining whether a command to be transmitted to a storage controller is within the restricted command set;
selectively encrypting the command to be transmitted to the storage controller, wherein selective encrypting the command includes encrypting the command if the command is within the restricted command set and bypassing encrypting the command if the command is outside the restricted command set;
transmitting an encrypted command within the restricted command set to the storage controller; and
transmitting an unencrypted command outside the restricted command set to the storage controller.

7. The method of claim 6 further comprising:
further operations by the storage controller including:
checking integrity of received command decrypting using an integrity pass/fail test; and
wherein selectively executing the decrypted command includes executing the decrypted command if the decrypted command passes the integrity pass/fail test and blocking execution of the decrypted command if the decrypted command fails the integrity pass/fail test.

8. The method of claim 6, further comprising:
further operations by the storage controller including:
receiving an unencrypted command; and
selectively executing the received unencrypted command if the received unencrypted command is determined to be outside the restricted command set.

9. The method of claim 6 further comprising:
further operations by a host including:
obtaining a public encryption/decryption key of a public-private encryption/decryption key pair for the storage controller;
obtaining a symmetric encryption/decryption key;
encrypting the symmetric encryption/decryption key using the public encryption/decryption key; and
transmitting the encrypted symmetric encryption/decryption key to the storage controller; and
the storage controller:
receiving the encrypted symmetric encryption/decryption key; and decrypting the symmetric encryption/decryption key using a private encryption/decryption key of the public-private encryption/decryption key pair for the storage controller.

10. The method of claim 9 wherein the host encrypting the command includes encrypting the command using the symmetric encryption/decryption key and wherein the storage controller decrypting the received command includes decrypting the received command using the symmetric encryption/decryption key.

11. A system, comprising:
host having a processor;
a storage controller having a processor and at least one storage unit of a plurality of storage units controlled by the storage controller; and
a computer program product comprising a computer readable storage medium having program instructions embodied therewith, a portion of the program instructions executable by a processor of the storage controller to cause storage controller processor operations, and a portion of the program instructions executable by a processor of the host to cause host processor operations, the storage controller processor operations comprising:
controlling said plurality of storage units to perform Input/Output (I/O) operations requested by the host;
receiving a command from the host;
determining if the received command is within a restricted command set;
in response to said determining if the received command is within the restricted command set, selectively decrypting the received command; and
selectively executing a decrypted command;
wherein selectively decrypting the received command includes decrypting the received command if the received command is determined to be within the restricted command set and bypassing decrypting the received command if the received command is determined to be outside the restricted command set; and
wherein the host has a processor, and wherein the system further comprises a further computer readable storage medium having further program instructions embodied therewith, the further program instructions executable by a processor of the host to cause host processor operations, the host processor operations comprising:
determining whether a command to be transmitted to a storage controller is within the restricted command set;
selectively encrypting the command to be transmitted to the storage controller, wherein selective encrypting the command includes encrypting the command if the command is within the restricted command set and bypassing encrypting the command if the command is outside the restricted command set;
transmitting an encrypted command within the restricted command set to the storage controller; and
transmitting an unencrypted command outside the restricted command set to the storage controller.

12. The system of claim 11 wherein the storage controller processor operations further comprise:
checking integrity of received command decrypting using an integrity pass/fail test; and
wherein selectively executing the decrypted command includes executing the decrypted command if the decrypted command passes the integrity pass/fail test and blocking execution of the decrypted command if the decrypted command fails the integrity pass/fail test.

13. The system of claim 11, wherein the storage controller processor operations further comprise:
receiving an unencrypted command; and
selectively executing the received unencrypted command if the received unencrypted command is determined to be outside the restricted command set.

14. The system of claim 11 wherein the host processor operations further comprise:
obtaining a public encryption/decryption key of a public-private encryption/decryption key pair for the storage controller;
obtaining a symmetric encryption/decryption key;
encrypting the symmetric encryption/decryption key using the public encryption/decryption key; and
transmitting the encrypted symmetric encryption/decryption key to the storage controller; and
wherein the storage controller processor operations further comprise:
receiving the encrypted symmetric encryption/decryption key; and
decrypting the symmetric encryption/decryption key using a private encryption/decryption key of the public-private encryption/decryption key pair for the storage controller.

15. The system of claim 14 wherein the host encrypting the command includes encrypting the command using the symmetric encryption/decryption key and wherein the storage controller decrypting the received command includes decrypting the received command using the symmetric encryption/decryption key.

* * * * *